United States Patent [19]

Tanaka et al.

[11] Patent Number: 6,025,451
[45] Date of Patent: Feb. 15, 2000

[54] METHOD OF PRODUCING PARTICULATE NATURAL RUBBER

[75] Inventors: Yasuyuki Tanaka, Hachioji, Japan; Jitladda Tangpakdee, Bangkok, Thailand; Yoshiaki Miyamoto, Kobe, Japan; Masaharu Hayashi, Wakayama, Japan; Eiji Kanamaru, Tokyo, Japan; Tadashi Mihara, Kitaadachi-gun, Japan

[73] Assignees: Sumitomo Rubber Industries, Ltd., Kobe; Higashi Kagaku Co., Ltd., Yao, both of Japan

[21] Appl. No.: 09/099,510

[22] Filed: Jun. 17, 1998

[30] Foreign Application Priority Data

Jun. 23, 1997 [JP] Japan .................................. 9-166232

[51] Int. Cl.$^7$ ................................ C08C 1/00; C08C 1/04; C08C 3/02
[52] U.S. Cl. .......................... 526/340.2; 525/54.1; 524/17
[58] Field of Search ....................... 526/340.2; 525/54.1; 524/17

*Primary Examiner*—Nathan M. Nutter

[57] ABSTRACT

A method of producing a particulate natural rubber, which comprises adding an inorganic salt to a serum obtained by centrifugal separation of a natural rubber latex in the amount enough to cause separation of a particulate natural rubber component in the serum, thereby to isolate the particulate natural rubber component as a cream component.

13 Claims, No Drawings

METHOD OF PRODUCING PARTICULATE NATURAL RUBBER

TECHNICAL FIELD

The present invention relates to a method of producing a particulate natural rubber. More particularly, it relates to a method of producing a particulate natural rubber, and reusing a serum obtained by the centrifugal separation of natural rubber latex.

BACKGROUND OF ART

An natural rubber latex is obtained as a sap from a Brazilian rubber tree (Hevea Brasilensis), and contains about 60% of water, about 30% of a rubber component and several % of a protein, a lipid and a mineral, which is normally referred to as a "field latex". On the other hand, natural rubber latex as an industrial raw material is fed as a purified natural rubber latex which is obtained by purifying with a concentration of the rubber component to about 60% and adding 0.2 to 0.7% of ammonia to the latex to prevent putrefaction of the latex.

As the method of purifying the latex by concentration, a centrifugal separation method with a high purification efficacy is generally used. According to this method, purified natural rubber latex is produced by separating a cream-like rubber component formed by centrifugal separation and redispersing the rubber component in water.

However, the serum formed during the centrifugal separation contains some rubber component having a small particle diameter which can not be recovered as the cream component. Therefore, it is required to recover and use such a rubber component in view of the production cost It is known that the rubber component having a small particle diameter contained in the serum is a fine particle having a particle diameter of about 0.1 to 0.5 μm, and the film-forming property and film strength of a latex film can be improved by adding the rubber component to a normal natural rubber latex. Accordingly, it is a considerably important object to recover the particulate natural rubber in the serum, from the viewpoint of overall production cost.

As the method of recovering the particulate natural rubber from the serum, for example, (A) a method of coagulating a rubber component in a serum using an acid to produce a skim block rubber and (B) a method of adding an acid and a nonionic surfactant to a serum to obtain an acidic latex (British Patent No. 743139) have heretofore been suggested.

However, both of the above methods (A) and (B) have a problem that, since the particulate natural rubber recovered from the serum contains a large amount of impurities, the quality is poor. Also, there is a problem in that, since the latex obtained by the above method (B) is acidic, the latex is limited to special use and has poor utility.

On the other hand, performances such as high electrical insulating properties, low water absorption and being allergy free, and the like, have recently been required of natural rubber products. In order to realize these features, it is required to highly deproteinize the particulate natural rubber.

As a method of obtaining a deproteinized particulate natural rubber, for example, (C) an enzyme is added to the serum to deproteinize the serum, followed by adding an acid, washing the coagulated rubber component with water and drying the rubber component to obtain a low-protein (about 0.4%) solid natural rubber (British Patent No. 695813). However, according to this method, it is difficult to obtain a particulate natural rubber which is allergy free and which contains as small amount of impurities.

Accordingly, it is also considerably important to recover the particulate natural rubber contained in the serum in the state of being deproteinized in view of a realization of high electrical insulating properties, low water absorption and allergy free properties as well as a reduction of the production cost.

SUMMARY OF THE INVENTION

It is an object of the present invention to provide a method of recovering a particulate natural rubber which is contained in a serum. The serum is obtained by the centrifugal separation of a natural rubber latex in high yield and high purity. It is another object of the present invention to provide a method of producing a deproteinized particulate natural rubber.

The present inventors have found that, by adding a predetermined amount of an inorganic salt to a serum previously obtained by the centrifugal treatment of a natural rubber latex (deproteinized natural rubber latex or non-deproteinized natural rubber latex), natural rubber fine particles can be recovered in a high yield and a high purity without performing any further operation such as centrifugal separation.

The present invention relates to the following:

(1) A method of producing a particulate natural rubber which comprises adding an inorganic salt to a serum. The serum is obtained by the centrifugal treatment of a natural rubber latex. The inorganic salt is added in an amount sufficient to cause phase separation of the particulate natural rubber component in the serum. Thus the particulate natural rubber component can be isolated as a cream component;

(2) The method of producing a particulate natural rubber as defined in item (1) above, wherein a protease is further added to the serum in an amount of 0.01 to 10 g based on 100 ml of the serum;

(3) The method of producing a particulate natural rubber as defined in item (1) above, wherein the natural rubber latex is a previously deproteinized natural rubber latex;

(4) The method of producing a particulate natural rubber in the form of a latex, which comprises adding an inorganic salt to a serum. The serum is obtained by the centrifugal treatment of a natural rubber latex and the inorganic salt is added in an amount sufficient to cause phase separation of a particulate natural rubber component in the serum. Thus, the particulate natural rubber component can be isolated as a cream component and subsequently redispersed in water;

(5) The method of producing a particulate natural rubber in the form of a latex as defined in the above item (4), wherein a protease is further added in an amount of 0.01 to 10 g based on 100 ml of the serum; and;

(6) The method of producing a particulate natural rubber in the form of a latex as defined in item (4) above, wherein the natural rubber latex is a previously deproteinized natural rubber.

According to the method of producing the particulate natural rubber of the present invention, other separating operations such as centrifugal separation are not required in the case of separating and recovering the particulate natural rubber from a serum, but rather, the particular natural rubber can be easily recovered in high yield by only adding an inorganic salt to the serum. Also, according to the method of the present invention, since only a cream component is isolated in the upper layer of the layer of the serum, impurities are not incorporated, unlike a conventional method of adding an acid to coagulate and precipitate a rubber component. Accordingly, according to the above method, a high-purity particulate natural rubber can be obtained.

Also, according to the present invention, a protease may be further added in the amount of 0.01 to 10 g based on 100 ml of the above serum. That is, the present method is characterized by adding an inorganic salt to a serum obtained by the centrifugal separation of a natural rubber latex, in an amount enough to cause phase separation of a particulate natural rubber component is the serum. A protease is additionally added in an amount of 0.01 to 10 g based on 100 ml of the serum, to deproteinize the serum, thereby to isolate the particulate natural rubber component as a cream component. According to this method, the natural rubber fine particles contained in the serum can be recovered form the serum by the same simple operation as that described above, and is also recovered as a particulate deproteinized natural rubber.

As the natural rubber latex used in the method of producing the particulate natural rubber of the present invention, not only a normal natural rubber latex, which is not deproteinized, may be used, but also a previously deproteinized natural rubber latex may be used. That is, the method of producing the particulate natural rubber of the present invention may be a method of centrifugally separating a previously deproteinized natural rubber latex, adding an inorganic salt to the serum thus obtained in an amount sufficient to cause phase separation of a particulate natural rubber component in the serum (together with a protease in the amount of 0.01 to 10 g based on 100 ml of the serum), thereby to isolate the particulate natural rubber component as a cream component, and recovering the particulate natural rubber.

The serum obtained by the centrifugal separation of the deproteinized latex contains a protease in high concentration, and it was difficult to recover the particulate deproteinized natural rubber substantially free of impurities. Therefore, such a serum has hitherto been discarded. However, according to the above method, a particulate deproteinized natural rubber can be recovered from the serum of the deproteinized natural rubber latex, which has hitherto been discarded, in an industrially advantageous manner.

As described above, the cream component isolated from the serum is normally used as a latex redispersed in water. By redispersing this cream component in water, the particulate natural rubber contained in the serum of the natural rubber latex (or deproteinized natural rubber latex) can be recovered as an alkali latex and not as an acidic latex.

BEST MODE FOR CARRYING OUT THE INVENTION

The method of producing the particulate natural rubber of the present invention is characterized by adding a predetermined amount of an inorganic salt to a serum obtained by the centrifugal separation of a natural rubber latex, to recover natural rubber fine particles contained in the serum as a cream component. Consequently, natural rubber fine particles having an average particle diameter of not more than 0.65 µm, preferably not more than 0.6 µm, can be obtained.

The natural rubber latex, which is not deproteinized, used in the present invention may be a commercially available ammonia-treated latex or a fresh field latex.

The serum of the natural rubber latex is normally obtained by centrifugal separation of a natural rubber latex at $1 \times 10^5$ to $1 \times 10^7$ rpm for about 30 minutes, and removing the isolated cream-like rubber component and impurities. This serum contains a large amount of a non-rubber component such as protein, in addition to the above natural rubber fine particles.

As the serum of the deproteinized natural rubber latex used in the present invention, for example, a serum obtained in the case of producing the deproteinized natural rubber latex according to the method disclosed in Japanese Laid-Open Patent Publication No. 6-56902 is used. That is, as the serum of the deproteinized natural rubber latex, for example, there can be used a serum obtained when a protease and a surfactant are added to the above ammonia-treated latex or field latex, to decompose the protein, and the deproteinized latex is repeatedly washed by centrifugal separation.

Examples of the surfactant used herein include anionic surfactants and nonionic surfactants. Examples of the anionic surfactant include carboxylic acid surfactants, sulfonic acid surfactants, sulfate surfactants, phosphate surfactants and the like. Examples of the nonionic surfactant include polyoxyalkylene ester surfactants, polyhydric alcohol fatty acid ester surfactants and the like. Among them, specific examples of the polyhydric alcohol fatty acid ester nonionic surfactant include fatty acid esters of a polyhydric alcohol having 2 to 12 carbon atoms, fatty acid esters of a polyoxyalkylene polyhydric alcohol and the like.

The inorganic salt used in the present invention is not specifically limited, but any water-soluble salt can be used and those having a water-solubility of not less than 5 at 0° C. or not less than 40 at 100° C. are preferably used. Examples thereof include sodium chloride (NaCl), sodium carbonate ($Na_2CO_3$), diammonium hydrogenphosphate (($NH_4)_2HPO_4$), sodium sulfate ($Na_2SO_4$), potassium carbonate ($K_2CO_3$), aluminum sulfate ($Al_2(SO_4)_3$), ammonium sulfate (($NH_4)_2SO_4$), aluminum potassium sulfate (AlK($SO_4)_2$), magnesium sulfate ($MgSO_4$), magnesium chloride ($MgCl_2$) and the like. These inorganic salts may be used along or in combination thereof.

The amount of the inorganic salt is appropriately selected considering the particular inorganic salt and the amount needed to cause phase separation of the particulate natural rubber component in the serum. For example, when using sodium chloride as the inorganic salt, the inorganic salt is suitably added in the amount within the range from 5 to 20 g, and preferably 5 to 10 g, based on 100 ml of the serum of the natural rubber latex. When using sodium carbonate, diammonium hydrogenphosphate, sodium sulfate, potassium carbonate, aluminum sulfate, ammonium sulfate, aluminum potassium sulfate, magnesium sulfate or the like, the inorganic salt is suitably added in the amount within the range from 12 to 20 g, and preferably from 15 to 20 g, based on 100 ml of the serum of the natural rubber latex.

When the amount of the inorganic salt added is smaller than the above range, there is the fear that the particulate natural rubber component and serum will not be separated. On the other hand, if the amount of the inorganic salt added exceeds the above range, the corresponding effect is not exerted and there is the fear that the cost becomes to high and a large amount of the inorganic salt will remain in the particulate natural rubber.

In the present invention, after adding the inorganic salt to the above serum, for mixture is preferably allowed to stand for about 12 to 24 hours to separate the cream-like particulate natural rubber component and serum.

The cream component isolated from the serum is used as the particulate natural rubber as it is, or used as a latex after redispersing in water. Other separating means such as centrifugal separation may be optionally used to isolate the cream component from the serum.

In the present invention, as the protease, those produced by a normal method can be used. For example, a commercially available alkali protease can be used and it is suitable that the enzyme activity is within the range of from 0.1 to 50 APU/g, preferably from 1 to 25 APU/g. The enzyme activity is a measured value obtained by using an improved method of the Anson-hemoglobin method (Anson. M. L., J. Gen. Physiol., 22, 79 (1983)). That is, the measurement was preformed as follows. The reaction is performed in a solution, adjusted so that a final concentration of an unrea-modified hemoglobin used as a substrate becomes 14.7 mg/ml, at the temperature of 25° C. and a pH of 10.5 for 10 minutes, and trichloroacetic acid is added so that the final concentration becomes 31.25 mg/ml. Then, the soluble matter of trichloroacetic acid is colored with a phenolic reagent and the activity per 10 minutes of the reaction was determined by using a calibration curve obtained by taking the degree of colorination of tyrosine (1 mol) as 1 APU. Finally, the resulting activity is reduced to a value per 1 minute of the reaction. The term "1 APU" used herein means an amount of a protease, which gives a trichloroacetic acid soluble matter having the same coloration degree as that obtained by coloring with the phenol reagent for 1 minute. The measurement of the activity of the protease (alkali protease) is not limited to the above measuring method.

In the present invention, the protease (e.g. alkali protease, etc.) may be used alone, but may be also used in combination with a publicly known enzyme such as lipase, esterase, amylase, cellulase or the like. The indicated value of the enyzme activity varies depending on the measuring method and unit, and examples of the other unit include NPU (novo-protease unit) and the like.

In case of adding the protease to the serum, an enzyme having the above activity is added so that the proteolysis reaction is sufficiently performed. It is suitable that the protease is added in the amount within the range from generally 0.01 to 10 g, and preferably from 0.04 to 2 g, based on 100 ml of the serum. When the amount of the protease is smaller than the above range, there is a fear that the proteolysis reaction becomes insufficient and the effect of the deproteinization treatment is not obtained. On the other hand, even if the amount of the protease added exceeds the above range, the corresponding effect is not obtained and there is the fear that the cost becomes higher and a large amount of the protease remains in the particulate natural rubber latex.

In the present invention, when the serum is deproteinized by adding the protease, a surfactant may be added together with the protease. Examples of the surfactant include anionic surfactants and nonionic surfactants.

In the present invention, when a predetermined amount of the protease is added in the serum of the natural rubber latex, the mixture is preferably allowed to stand with adjusting the temperature of the serum within the range from room temperature to about 40° C., particularly about 37° C., for 12 to 24 hours in view of enhancement of the effect of the deproteinization treatment.

As described above, according to the present invention, the particulate natural rubber contained in the serum of the natural rubber latex can be easily recovered in high yield, to obtain a high-purity particulate natural rubber product.

EXAMPLES

Test Example 1

(Production of particulate natural rubber in the form of latex)

To 100 ml of a serum (total solid content: 8.5%) of a high ammonia latex, each of the inorganic salts shown in Table 1 was added in the proportion shown in Table 1, and the mixture was allowed to stand at 37° C. for 24 hours.

As a result, a cream component was isolated in the upper layer of the layer of the serum. This cream component was taken out and diluted with distilled water.

The amount of the inorganic salt added was set in four kinds, e.g. 10 g, 12 g, 15 g and 20 g, and then (1) a state of phase separation, (2) a recovery (%) of a particulate natural rubber and (3) an average particle diameter ($\mu$m) of the recovered particulate natural rubber was determined with respect to the kind and amount of the inorganic salt, respectively.

The state of phase separation of the above item (1) was evaluated according to the following criteria.

○: Complete phase separation occurred.
Δ: The proportion of the phase separation is from about 50 to 90%
x: The proportion of the phase separation is less than 50%.

The average particle diameter of the particulate natural rubber of the above item (3) was measured by using a laser diffraction/scattering type particle size distribution measuring device ("Model LA-901", manufactured by Horiba Seisakusho Co., Ltd.), and then an average particle diameter ($\mu$m) on the volume basis was determined.

The above results are shown in Table 1.

Test Example 2

(Production of particulate deproteinized natural rubber in the form of latex)

To 100 ml of a serum (total solid content: 8.5%, dry rubber content: 5.8%) of a field latex, each of the inorganic salts shown in Tables 2 and 3 was added in the proportion shown in Tables 2 and 3 was added in the proportion shown in Tables 2 and 3 and 0.04 g of a protease (alkali protease, activity: 10.5 APU/g) was further added, and the mixture was allow to stand at 37° C. for 24 hours. As a result, a cream component was isolated in the upper layer of the layer of the serum. This cream component was taken out and diluted with distilled water. The amount of the

TABLE 1

| Kind of Inorganic Salt | Amount (g) of inorganic salt added to 100 ml of serum | | | |
|---|---|---|---|---|
| | 20 | 15 | 12 | 10 |
| Sodium carbonate Na$_2$CO$_3$ | ① ○ ② 100% ③ 0.56 | ① ○ ② 100% ③ 0.55 | ① Δ ② 60% ③ 0.60 | ① X ② — ③ — |
| Diammonium hydrogenphosphate (NH$_4$)$_2$HPO$_4$ | ① ○ ② 100% ③ 0.57 | ① ○ ② 100% ③ 0.58 | ① Δ ② 50% ③ 0.62 | ① X ② — ③ — |
| Sodium sulfate Na$_2$SO$_4$ | ① ○ ② 100% ③ 0.56 | | ① ○ ② 100% ③ 0.57 | ① X ② — ③ — |
| Potassium carbonate K$_2$CO$_3$ | ① ○ ② 100% ③ 0.55 | ① ○ ② 100% ③ 0.57 | ① Δ ② 60% ③ 0.61 | ① X ② — ③ — |
| Ammonium sulfate | ① ○ | ① ○ | ① Δ | ① X |

TABLE 1-continued

| Kind of Inorganic Salt | Amount (g) of inorganic salt added to 100 ml of serum | | | |
|---|---|---|---|---|
| | 20 | 15 | 12 | 10 |
| $(NH_4)_2SO_4$ | ② 100% ③ 0.54 | ② 100% ③ 0.56 | ② 50% ③ 0.63 | ② — ③ — |

1: State of phase separation
2: Recovery (%) of particulate natural rubber
3: Average particle diameter ($\mu$m) of recovered particulate natural rubber inorganic salt added was set in four kinds, and then the above evaluation and measurement of the above items (1) to (3) were performed with respect to the kind and amount of the inorganic salt, respectively. Furthermore, (4) the nitrogen content (N %) of the recovered particulate natural rubber was determined by the Kjeldahl method.

The above results are shown in Tables 2 and 3.

Test Example 3
(Production of particulate deproteinized natural rubber in the form of latex)

To 100 ml of a serum (total solid content: 5.8%) of a deproteinized natural rubber latex, each of organic salts shown in Table 4 was added in the proportion shown in Table 4, and the mixture was allowed to stand at 37° C. for 24 hours.

As a result, a cream component was isolated in the upper layer of the layer of the serum. This cream component was taken out and diluted with distilled water. The amount of the inorganic salt added was set in four kinds in the same manner as described above, and then the above evaluation and measurement of the above items (1) to (4) were performed with respect to the kind and amount of the inorganic salt, respectively.

The above results are shown in Table 4.

TABLE 2

| Kind of Inorganic Salt | Amount (g) of inorganic salt added to 100 ml of serum | | | |
|---|---|---|---|---|
| | 20 | 15 | 12 | 10 |
| Sodium carbonate $Na_2CO_3$ | ① ○ ② 100% ③ 0.56 ④ 0.017% | | ① ○ ② 100% ③ 0.58 ④ 0.018% | ① X ② — ③ — ④ — |
| Diammonium hydrogen-phosphate $(NH_4)_2HPO_4$ | ① ○ ② 100% ③ 0.54 ④ 0.018% | | ① ○ ② 100% ③ 0.57 ④ 0.018% | ① X ② — ③ — ④ — |
| Sodium sulfate $Na_2SO_4$ | ① ○ ② 100% ③ 0.52 ④ 0.019% | ① ○ ② 100% ③ 0.54 ④ 0.018% | ① △ ② 70% ③ 0.59 ④ 0.019% | ① X ② — ③ — ④ — |
| Potassium carbonate $K_2CO_3$ | ① ○ ② 100% ③ 0.53 ③ 0.019% | | ① ○ ② 100% ③ 0.54 ④ 0.018% | ① X ② — ③ — ④ — |
| Aluminum sulfate $Al_2(SO_4)_3$ | ① ○ ② 100% ③ 0.58 ④ 0.018% | ① ○ ② 100% ③ 0.57 ④ 0.019% | ① △ ② 50% ③ 0.62 ④ 0.019% | ① X ② — ③ — ④ — |
| Ammonium sulfate $(NH_4)_2SO_4$ | ① ○ ② 100% ③ 0.57 ④ 0.019% | ① ○ ② 100% ③ 0.58 ④ 0.019% | ① △ ② 70% ③ 0.57 ④ 0.018% | ① X ② — ③ — ④ — |
| Aluminum potassium sulfate | ① ○ ② 100% ③ 0.53 | ① ○ ② 100% ③ 0.55 | ① △ ② 60% ③ 0.60 | ① X ② — ③ — |

TABLE 2-continued

| Kind of Inorganic Salt | Amount (g) of inorganic salt added to 100 ml of serum | | | |
|---|---|---|---|---|
| | 20 | 15 | 12 | 10 |
| $AlK(SO_4)_2$ | ④ 0.019% | ④ 0.018% | ④ 0.019% | ④ — |
| Magnesium sulfate $MgSO_4$ | ① ○ ② 100% ③ 0.55 ④ 0.018% | | ① ○ ② 100% ③ 0.57 ④ 0.019% | ① X ② — ③ — ④ — |

1: State of phase separation
2: Recovery (%) of particulate natural rubber
3: Average particle diameter ($\mu$m) of recovered particulate natural rubber
4: Nitrogen content (N %) of recovered particulate natural rubber

TABLE 3

| Kind of Inorganic Salt | Amount (g) of inorganic salt added to 100 ml of serum | | |
|---|---|---|---|
| | 10 | 5 | 3 |
| Sodium chloride NaCl | ① ○ ② 100% ③ 0.56 ④ 0.019% | ① ○ ② 100% ③ 0.57 ④ 0.019% | ① X ② — ③ — ④ — |

1: State of phase separation
2: Recovery (%) of particulate natural rubber
3: Average particle diameter ($\mu$m) of recovered particulate natural rubber
4: Nitrogen content (N %) of recovered particulate natural rubber

TABLE 4

| Kind of Inorganic Salt | Amount (g) of inorganic salt added to 100 ml of serum | | | |
|---|---|---|---|---|
| | 20 | 15 | 12 | 10 |
| Sodium carbonate $Na_2CO_3$ | ① ○ ② 100% ③ 0.56 ④ 0.018% | | ① ○ ② 100% ③ 0.57 ④ 0.017% | ① X ② — ③ — ④ — |
| Diammonium hydrogen-phosphate $(NH_4)_2HPO_4$ | ① ○ ② 100% ③ 0.57 ④ 0.018% | ① ○ ② 100% ③ 0.55 ④ 0.019% | ① △ ② 80% ③ 0.59 ④ 0.019% | ① X ② — ③ — ④ — |
| Sodium sulfate $Na_2SO_4$ | ① ○ ② 100% ③ 0.56 ④ 0.017% | | ① ○ ② 100% ③ 0.57 ④ 0.018% | ① X ② — ③ — ④ — |
| Potassium carbonate $K_2CO_3$ | ① ○ ② 100% ③ 0.55 ④ 0.018% | | ① ○ ② 100% ③ 0.54 ④ 0.018% | ① X ② — ③ — ④ — |
| Aluminum sulfate $Al_2(SO_4)_3$ | ① ○ ② 100% ③ 0.57 ④ 0.019% | ① ○ ② 100% ③ 0.56 ④ 0.018% | ① △ ② 60% ③ 0.61 ④ 0.019% | ① X ② — ③ — ④ — |
| Ammonium sulfate $(NH_4)_2SO_4$ | ① ○ ② 100% ③ 0.54 ④ 0.019% | | ① ○ ② 100% ③ 0.53 ④ 0.019% | ① X ② — ③ — ④ — |
| Aluminum potassium sulfate $AlK(SO_4)_2$ | ① ○ ② 100% ③ 0.54 ④ 0.018% | ① ○ ② 100% ③ 0.55 ④ 0.018% | ① △ ② 70% ③ 0.59 ④ 0.019% | ① X ② — ③ — ④ — |
| Magnesium sulfate | ① ○ ② 100% | | ① ○ ② 100% | ① X ② — |

TABLE 4-continued

| Kind of Inorganic Salt | Amount (g) of inorganic salt added to 100 ml of serum | | | |
|---|---|---|---|---|
| | 20 | 15 | 12 | 10 |
| MgSO$_4$ | ③ 0.56<br>④ 0.918% | ③ 0.57<br>④ 0.019% | ③ —<br>④ — | |

1: State of phase separation
2: Recovery (%) of particulate natural rubber
3: Average particle diameter (μm) of recovered particulate natural rubber
4: Nitrogen content (N %) of recovered particulate natural rubber As is apparent from the results shown in Tables 1 to 4, in case of using any inorganic salt, in case of using any inorganic salt, by adding an inorganic salt to a serum in the amount enough to cause phase separation of a particulate natural rubber component in a serum, the particulate natural rubber component could be recovered as a cream component without performing other separating operations such as centrifugal separation.

To the contrary, when the amount of the inorganic salt added is insufficient (that is, sufficient phase separation did not occurred), there arose a problem that a large amount of non-rubber component such as protein was incorporated in case of recovering the rubber component.

Also, as is apparent from the results of Tables 2 to 4, when an inorganic salt and a protease are added in a serum of a natural rubber latex, or a previously deproteinized natural rubber latex is used, the nitrogen content (N %) of the particulate natural rubber is considerably low such as not more than 0.02% and a deproteinization treatment was performed to the degree enough to exert performances such as high electrical insulating properties, low water absorption, allergy free and the like.

The disclosure of Japanese Patent Application Serial No. 9-166232, filed on Jun. 23, 1997, is incorporated herein by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of producing particulate natural rubber which comprises:

centrifugally treating in natural rubber latex to obtain a serum adding an inorganic salt to the serum in an amount sufficient to cause phase separation of a particulate natural rubber component as a cream component in the serum and recovering the cream component from the serum.

2. The method of producing a particulate natural rubber according to claim 1, wherein a protease is further added to the serum in the amount of 0.01 to 01 g based on 100 ml of the serum.

3. The method of producing a particulate natural rubber according to claim 1, wherein the natural rubber latex is initially deproteinized to form a deproteinized natural rubber latex.

4. The method of claim 1, wherein the cream component of particulate natural rubber is redispersed in water.

5. The method of claim 1, wherein the centrifugal treatment is conducted at $1 \times 10^5$ to $1 \times 10^7$ rpm.

6. The method of claim 1, wherein the inorganic salt is a water-soluble salt having a water-solubility of not less than 5 at 0° C. to not less than 40 at 100° C.

7. The method of claim 1, wherein the inorganic salt is selected from the group consisting of sodium chloride, sodium carbonate, diammonium hydrogenphosphate, sodium sulfate, potassium carbonate, aluminum sulfate, ammonium sulfate, aluminum potassium sulfate, magnesium sulfate and magnesium chloride.

8. The method of claim 1, wherein the inorganic salt is added in an amount of from 5 to 20 g based on 100 ml of the serum.

9. The method of claim 4, wherein the inorganic salt is a water-soluble salt having a water-solubility of not less than 5 at 0° C. to not less than 40 at 100° C.

10. The method of claim 4, wherein the inorganic salt is selected from the group consisting of sodium chloride, sodium carbonate, diammonium hydrogenphosphate, sodium sulfate, potassium carbonate, aluminum sulfate, ammonium sulfate, aluminum potassium sulfate, magnesium sulfate and magnesium chloride.

11. The method of claim 4, wherein the inorganic salt is added in an amount of from 5 to 20 g based on 100 ml of the serum.

12. The method of producing a particulate natural rubber in the form of a latex according to claim 4, wherein a protease is further added to the serum in the amount of 0.01 to 10 g based on 100 ml of the serum.

13. The method of producing a particulate natural rubber in the form of a latex according to claim 4, wherein the natural rubber latex is initially deproteinized to form a deproteinized natural rubber latex.

* * * * *

UNITED STATES PATENT AND TRADEMARK OFFICE
CERTIFICATE OF CORRECTION

PATENT NO. : 6,025,451
DATED : February 15, 2000
INVENTOR(S): Yasuyuki TANAKA et al.

It is certified that error appears in the above-identified patent and that said Letters Patent are hereby corrected as shown below:

In column 10, line 6 (claim 2), please change "0.01 to 0l g" to -- 0.01 to 10 g --.

Signed and Sealed this

Eighth Day of May, 2001

*Attest:*

NICHOLAS P. GODICI

*Attesting Officer*    *Acting Director of the United States Patent and Trademark Office*